United States Patent [19]

Nall et al.

[11] 4,434,689
[45] Mar. 6, 1984

[54] CUTTER HEAD DRIVE SHAFT FOR PORTABLE TUBE END PREPARATION TOOL

[75] Inventors: Lawson H. Nall, Folsom; Richard Miller, Citrus Heights, both of Calif.

[73] Assignee: Tri Tool Inc., Rancho Cordova, Calif.

[21] Appl. No.: 406,541

[22] Filed: Aug. 9, 1982

[51] Int. Cl.³ .......................... B23B 27/00; B23B 5/16
[52] U.S. Cl. .......................................... 82/4 C; 82/30
[58] Field of Search .................. 82/4 C, 4 R, 4 A, 30

[56] References Cited

U.S. PATENT DOCUMENTS 3,067,651 12/1962 Hogden et al. ........................ 82/4 C
3,229,555 1/1966 Castles, Jr. ............................ 82/4 C
3,875,832 4/1975 Mayfield ................................ 82/4 C Primary Examiner—Leonidas Vlachos
Attorney, Agent, or Firm—Bacon & Thomas

[57] ABSTRACT

A portable tube end preparation tool includes an improved drive shaft for the cutter head of the tool, the drive shaft comprising a compact, three-piece assembly including two shaft portions that are axially aligned with respect to each other along the tool axis, and a coupling sleeve that fits over and joins the shaft portions together through threaded connections at adjoining ends of the shaft portions. The shaft portions and coupling sleeve cooperate with rolling bearing assemblies to react operational load forces into the tool housing through the bearing assemblies.

3 Claims, 5 Drawing Figures

CUTTER HEAD DRIVE SHAFT FOR PORTABLE TUBE END PREPARATION TOOL

BACKGROUND OF THE INVENTION

1. Field of the Invention

The present invention relates to portable tools for machining the end of a pipe or tube workpiece for enabling subsequent welding of the workpiece. Such tools are commonly referred to in the welding field as pipe or tube end preparation tools.

2. Description of the Prior Art

Portable tube end preparation tools are generally well-known in the prior art, and are exemplified in U.S. Pat. Nos. 3,051,059, 3,131,599, 3,228,268, and 4,319,503.

In such prior art systems, the cutter head of the tool carries the tool bits and is rotatable about the longitudinal axis or other cutting axis of the tool. The cutter head is driven by a drive shaft arrangement that usually is supported within the tool housing by a bearing or the like that may simply be comprised of a sliding bearing surface on the inside of the housing against which the cutter head drive shaft rotates. While rolling or ball-type bearings are also utilized to support drive shafts, such bearings are rather conventionally used without regard to the objective of reducing the size or weight of the drive shaft assembly or reducing the overall size of the tool housing. Moreover, in accordance with prior art applications, since thrust and radial loads from the cutter head must be reacted into the tool housing through the drive shaft, the various drive line parts must be constructed quite ruggedly to withstand the rigors of repeated and continuous machining operations under severe operating conditions. Consequently, the overall size of such portable pipe end preparation tools must be adequate to accommodate the rugged drive line components and the components themselves must be designed to withstand the stress loads that are expected to be encountered during the operational life of the tool. Any desired downsizing of the portable tool, as well as weight savings desired to be effected, tends to be limited by the apparent need to provide rather large and massive drive components and bearing surfaces for the rotating drive line parts within the tool.

The present invention is concerned with a drive shaft assembly for a portable tube end preparation tool that overcomes the problems associated with prior art tools of the type described above.

BRIEF SUMMARY OF THE INVENTION

The present invention is intended to provide a compact, lightweight yet strong, drive shaft assembly for a portable tube end preparation tool. The improved drive shaft system is arranged to cooperate with rolling bearings (roll, ball, etc.) within the housing and to facilitate simple assembly and disassembly of the tool.

Specifically, the drive shaft for the cutter head of the tool is formed in three parts, including: a first and second cylindrical shaft portion that are each concentrically aligned with each other along the tool or cutter head axis and each including external threads on their adjacent ends; and a coupling sleeve that is internally threaded and joined in bridging relationship to the first and second shaft portions by means of the threads thereon. A pair of rolling bearing assemblies is located along the tool axis on the drive shaft portions for supporting and locating the first and second shaft portions within the housing, and the coupling sleeves spans the distance between the bearing assemblies to act as a spacer for the bearings and to react thrust loads (along the shaft axis) into the bearings and ultimately into the housing.

This simple and novel arrangement permits the drive shaft components to be constructed of thinner material due to the reinforcement provided by the coupling sleeve, to thereby enable the housing to be reduced in size and the weight of the tool likewise to be optimized. The invention moreover provides a simple yet rugged low friction bearing support assembly for the drive shaft parts that accommodates and reacts radial and thrust loads without requiring the use of large area sliding surfaces within the housing or complex bearing support structure. The entire drive shaft and bearing assembly is insertable or removable as a unit into or out of the housing for ease of assembly, inspection and repair.

Other features and advantages of the invention will become evident from a consideration of the following description of a preferred embodiment of the invention.

DETAILED DESCRIPTION OF PREFERRED EMBODIMENT

Figures 1, 5:
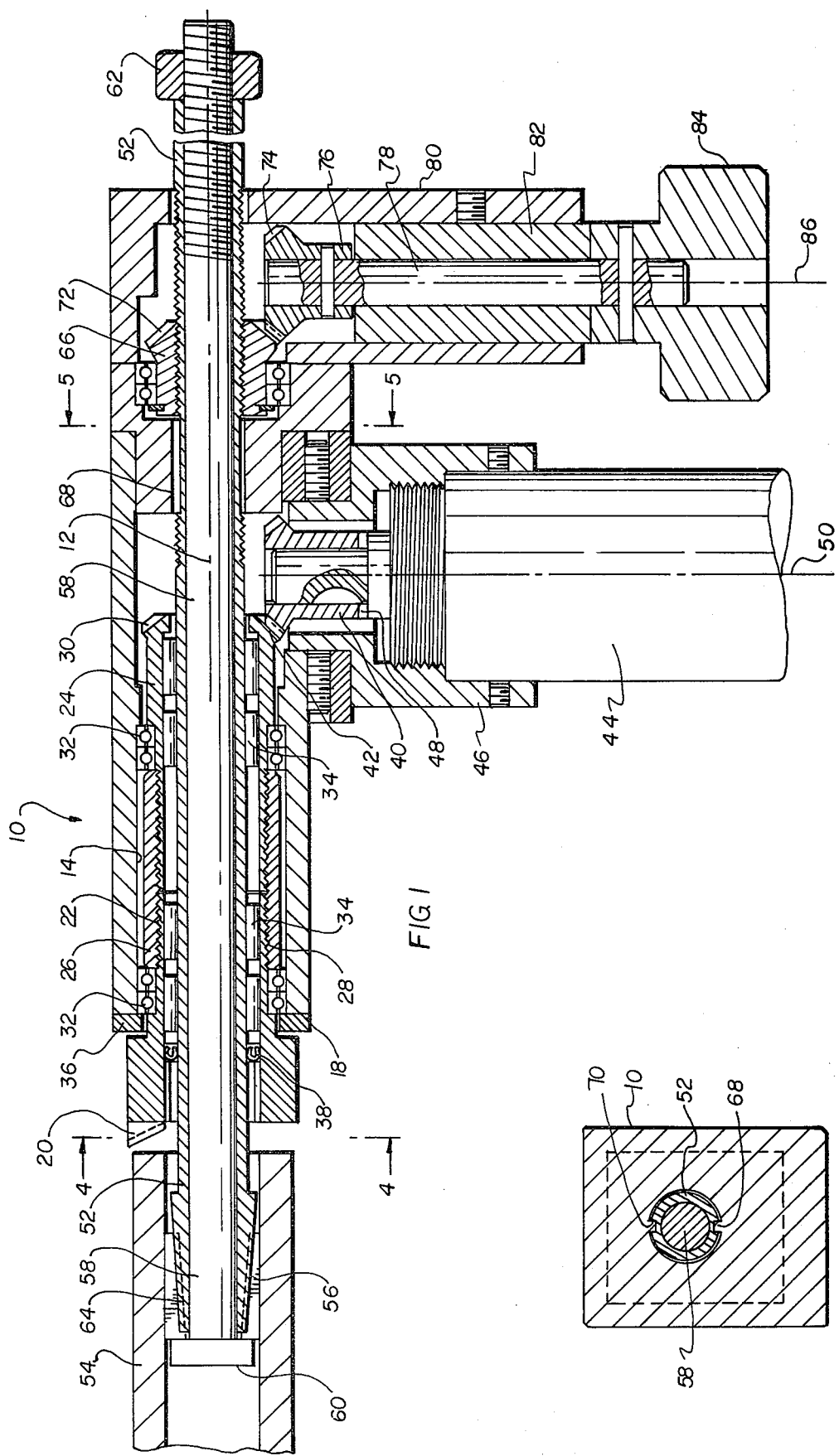
FIG. 1 is a side elevation view taken along a central section of a preferred embodiment of a pipe end preparation tool constructed in accordance with the present invention.
FIG. 5 is a view taken along section V—V of FIG. 1.
Figure 2:
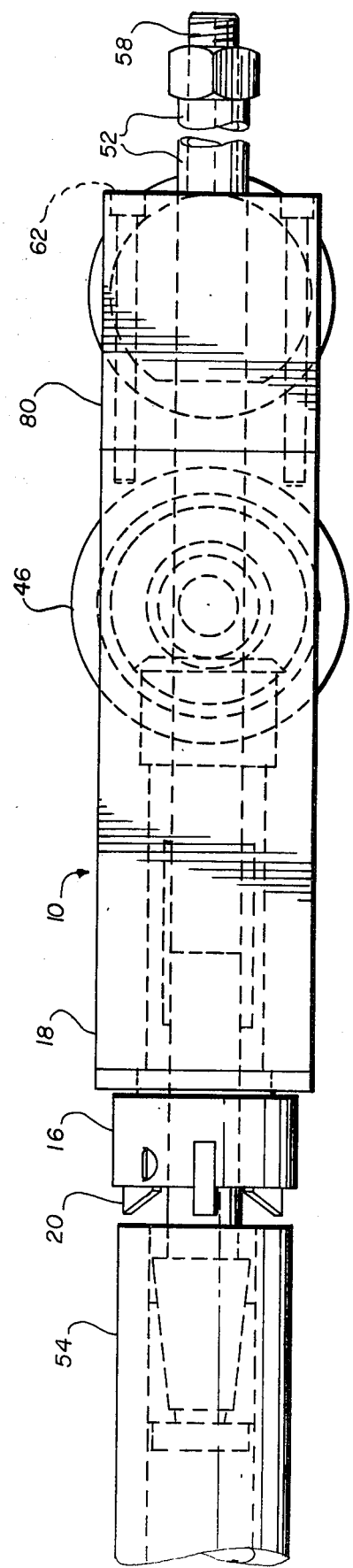
FIG. 2 is an upper view of FIG. 1.
Figure 4:
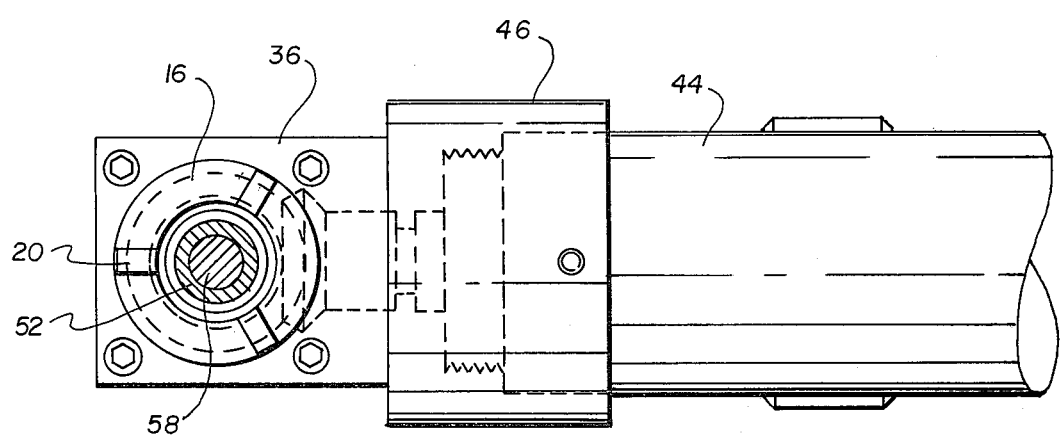
FIG. 4 is a left end view of FIG. 1 taken along line IV—IV of FIG. 1.

With reference to FIG. 1, a pipe end preparation tool embodying a preferred form of the present invention is shown at 10. The housing 10 extends along a longitudinal axis 12 and includes a longitudinal opening 14 extending substantially along the longitudinal axis of the housing.

A cutter head 16 is connected to the open, forward end 18 of the housing 10, the cutter head 16 mounted for rotation about longitudinal axis 12. Tool cutter bits 20, for example, beveling, facing, and/or boring bits, are secured by suitable means to the forward end of the cutter head 16 in a suitable manner. The cutter head 16 is annular in shape for reasons that will be explained more fully below, and is mounted to the housing 10 by means of a drive shaft system and associated bearings.

In accordance with the present invention, the drive shaft system for the cutter head 16 includes a first drive shaft part comprising a first shaft portion 22, a second shaft portion 24, and a coupling sleeve 26 that joins the shaft portions 22, 24 together by means of a threaded connection 28. The threaded connection 28 includes external threads on drive shaft portions 22, 24 and internal threads on the coupling 26. The first and second drive shaft portions 22, 24 are hollow, and the second drive shaft portion 24 is connected to a 45° bevel gear 30, which is annular in form.

The drive shaft portions 22, 24 are supported within the housing 10 by means of radial and thrust rolling bearings 32 mounted on shaft portions 22, 24. The bearings 32 are axially spaced along the longitudinal axis 12 of the housing 10. The coupling sleeve 26 axially engages the bearings 32 and secures them to the drive shaft portions 22, 24 as a complete assembly that can be removed or inserted as a unit from or into the tool housing through end 14. The bearings themselves engage the first and second shaft portions 22, 24 and the interior of the housing 10, whereby the cutter head 16 and the first drive shaft part, including drive shaft portions 22, 24 are constrained against axial and radial movement within the housing 10. The sleeve 26 acts as a spacer for the bearing and reacts thrust loads into the bearings, which in turn react operating loads into the housing. The rear (to the right in FIG. 1) bearing is specifically arranged to react rearward thrust loads into the housing via the coupling sleeve.

Rolling needle bearings 34 are disposed within shaft portions 22, 24 along the longitudinal axis 12 for supporting a mandrel shaft (to be described below) within the drive shaft portions.

A cover 36 is attached to the end 18 of housing 10 and extends between the drive shaft portion 22 and housing 10 for retaining the drive shaft end bearings axially in place within the housing 10. A seal 38 may be provided within the cutter head 16 and drive shaft portion 22 for preventing entry of contamination into the housing along the mandrel shaft (yet to be described). The cutter head drive system includes a second drive shaft part 40 that includes a 45° bevel gear 42 that drivingly engages bevel gear 30 on the end of drive shaft portion 24.

A drive motor having a housing 44 is connected to housing 10 through an adapter 46 that is secured by a suitable fastener to the housing. The motor housing 44 includes a motor drive shaft 48 that is keyed to the second drive shaft part 40 in a suitable manner whereby the bevel gear 42 is driven by the motor drive shaft 48.

The motor housing 44, adapter 46, and the second drive shaft part 40 are removable as a unit from the exterior of the housing 10 for inspection or repair without needing to disassemble the remaining parts of the cutter head drive system. Moreover, the second drive shaft part 40 extends along a transverse axis 50 perpendicular to the longitudinal axis 12. The motor housing 44, likewise extends along the transverse axis 50 and serves to provide a manipulating handle for the tool housing 10.

A mandrel assembly including a hollow mandrel shaft 52 extends longitudinally through the housing 10, including through the cutter head 16, drive shaft portions 22, 24 and bevel gear 30. The mandrel shaft 52 secures the tool to a workpiece 54 in a well-known manner. The workpiece 54 typically is a tube to be machined at its end by the tool bits 20 to prepare the tube for welding. In addition to the mandrel shaft 52, the mandrel includes radially expanding blades 56 that are arranged to be driven radially outwardly into engagement with the interior of the tube by a draw bar 58 which includes an enlarged end 60. The bar 58 is longitudinally moved by means of a mandrel actuating nut 62 located at the opposite end of the bar (to the right of FIG. 1). The mandrel actuating nut 62 is threadedly engaged to the bar 58, whereby rotation of the nut 62 causes the bar 58 to move longitudinally within the mandrel shaft 52 to cause the blades 56 to ride along a cam surface presented on an enlarged end 64 of mandrel shaft 52. The various details of the mandrel construction do not constitute a part of this invention.

A feed nut 66 that is annular in form and includes internal helical threads is provided within housing 10 in axially spaced relationship with respect to the cutter head drive shaft elements. Mandrel shaft 52 extends through feed nut 66 and includes external threads that are coupled to the threads of the feed nut 66, whereby rotation of the feed nut causes relative axial motion between housing 10 and mandrel shaft 52. If the workpiece 54 is fixed, for example, rotation of the feed nut 62 causes the tool housing 10, including the cutter head 16, to advance into engagement with the the tube end. On the other hand, if the tool housing is held fixed while the tube workpiece 54 is permitted to translate along its longitudinal axis, rotation of feed nut 66 will pull the tube 54 into the cutter bits 20 via axial movement of mandrel shaft 52.

The housing 10 and mandrel shaft 52 are prevented from rotating relative to each other by a torque reacting key arrangement best seen in FIG. 5. The housing 10 (or a suitable sub-assembly connected to the housing 10) includes longitudinally and radially extending keys 68 and a longitudinally extending keyway 70 is provided along the periphery of mandrel shaft 52. Accordingly, when the mandrel shaft 52 is placed within the housing and secured to the workpiece by blades 56, when the workpiece 54 is locked against rotation the mandrel shaft 52 will in turn lock the housing 10 against rotation about the longitudinal axis 12, despite the torque applied to the drive shaft portions 22, 24 by motor 44. This results in the tool having a "self-torque accepting feature" that is highly desirable in a tool of this type. Without this feature, the operator would need to react the torque of the drive motor while the tool is operating, which results in operator fatigue.

Figure 3:
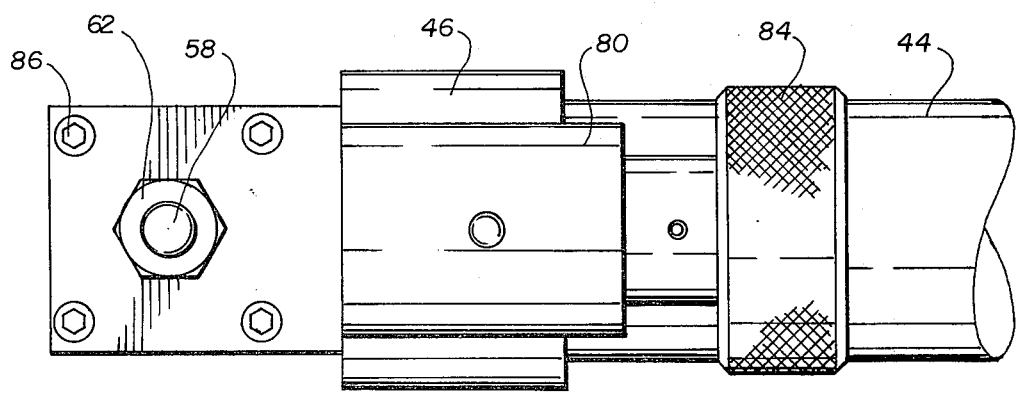
FIG. 3 is a partial right end view of FIG. 1.

The feed nut 66 is connected to a feed nut bevel 72 which is annular in form, like the feed nut 66 itself. A feed nut drive system includes another 45° bevel gear 74 that engages the bevel gear 72 on feed nut 66. Bevel gear 74 is connected to a first feed nut drive shaft portion 76, which in turn is connected to a second feed nut drive shaft portion 78 that is mounted within a casing 80 for the feed nut drive shaft assembly. A suitable bushing means 82 supports the feed nut drive shaft portion 78 within the casing 80. A hand knob 84 is provided to enable manipulation of the feed nut drive system, which is separable as an assembly from the housing 10 when the casing 80 is removed from said housing by removing fasteners 86 (FIG. 3). Removal of the feed nut drive assembly can be accomplished without disassembling the remainder of the tool (except that the mandrel will usually be removed from the tool before disassembly of the feed nut drive shaft assembly). This arrangement of the feed nut drive system permits inspection and repair of the feed drive system without dismantling the entire tool.

The feed nut drive portions 76, 78 are disposed along a transverse axis 86 and, in the preferred embodiment, axis 86 is parallel to axis 50 of the motor 44 and cutter head drive shaft part 40. These elements preferably lie in the same general plane that includes longitudinal axis 12, resulting in a shorter overall tool length as compared with prior art tools of this type and in a more convenient arrangement for advancing the feed nut 66. It will be apparent that manipulation of the housing 10 by means of motor 44 can be accomplished with one hand, while the thumb of the same, or another hand, if so preferred, can conveniently engage and manipulate feed nut knob 84. In the prior art arrangements, the feed nut drive knob is disposed along the axis of the tool housing, and this can present problems to the tool operator when the tool is being used in extremely close quarters or when other structure is located close to the tool housing. By locating the motor 44 and its associated drive shaft system in parallel with the feed nut drive system, the overall width of the tool is held to a minimum, further enhancing the ability of the tool to be utilized in extremely confined surroundings.

Various changes within the knowledge of a skilled mechanic can be made to the preferred embodiment without departing from the spirit and scope of the invention, which is set forth in the following claims.

We claim:

1. In a portable tube end preparation tool including a housing extending along a longitudinal axis; a cutter head mounted at one end of the housing for rotation about said longitudinal axis; a cutter head drive shaft means connected to said cutter head for transmitting rotational drive force thereto and including a drive shaft means within the housing, the improvement comprising: said drive shaft means comprising a three-piece assembly including a first cylindrical shaft portion connected directly to the cutter head and extending along said longitudinal axis; a second cylindrical shaft portion axially aligned and concentrically disposed with respect to said first shaft portion, said first and second shaft portions including external threads adjacent their adjoining ends; an internally threaded coupling sleeve bridging the adjoining ends of said first and second shaft portions and threadedly connected thereto for joining the assembly together; and axially spaced rolling bearing means within the housing disposed along said longitudinal axis at opposite ends of said coupling sleeve, said bearings respectively engaging said first and second shaft portions; said coupling sleeve, in cooperation with said bearings, restraining longitudinal and radial motion of said first and second drive shaft portions with respect to said housing.

2. The improvement in a portable tube end preparation tool as claimed in claim 1, said second drive shaft portion terminating within the housing at a 45° bevel gear at the end thereof opposite the end adjacent the first drive shaft portion; and a drive shaft part extending perpendicular to said longitudinal axis, one end of said drive shaft part terminating within the housing at a 45° bevel gear; said bevel gears being drivingly coupled together within the housing.

3. The improvement in a tube end preparation tool as claimed in claim 2, said bearing means being connected as an assembly to said first and second shaft portions and retained in spaced apart relationship by means of said coupling sleeves.

* * * * *